US 12,117,603 B2

(12) United States Patent
Vorontsov

(10) Patent No.: US 12,117,603 B2
(45) Date of Patent: Oct. 15, 2024

(54) ON-MIRROR INTEGRATED ADAPTIVE OPTICS

(71) Applicant: II-VI DELAWARE, INC., Wilmington, DE (US)

(72) Inventor: Mikhail Vorontsov, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 588 days.

(21) Appl. No.: 17/385,474

(22) Filed: Jul. 26, 2021

(65) Prior Publication Data

US 2023/0025437 A1 Jan. 26, 2023

(51) Int. Cl.
*G02B 26/00* (2006.01)
*G02B 17/08* (2006.01)
*G02B 27/00* (2006.01)
*G02B 27/09* (2006.01)

(52) U.S. Cl.
CPC ......... *G02B 26/00* (2013.01); *G02B 17/0816* (2013.01); *G02B 27/0025* (2013.01); *G02B 27/0916* (2013.01); *G02B 26/001* (2013.01)

(58) Field of Classification Search
None
See application file for complete search history.

(56) References Cited

U.S. PATENT DOCUMENTS

| 6,911,637 | B1 | 6/2005 | Vorontsov et al. |
| 7,967,456 | B2 | 6/2011 | Beresnev et al. |
| 2013/0215527 | A1 | 8/2013 | Beresnev et al. |
| 2020/0366048 | A1 | 11/2020 | Vorontsov et al. |

FOREIGN PATENT DOCUMENTS

EP 2189769 A1 5/2010

OTHER PUBLICATIONS

Alcock, Sutter, Kawal, Sawhney, Hall, McAuley, Sorensen, Bimorph mirrors: The Good, the Bad, and the Ugly, Nuclear Instruments and Methods in Physics Research Section A: Accelerators, Spectrometers, Detectors and Associated Equipment, vol. 710, May 11, 2013, pp. 87-92 (Year: 2013).*
European Search Report issued in EP22180412 on Feb. 16, 2023.
Griffith, Mike , et al., "Wavefront Modifier With Integrated Sensor", Proc. of SPIE, XP093020223, 2009, vol. 7476, 8 pages.

* cited by examiner

*Primary Examiner* — Stephone B Allen
*Assistant Examiner* — Tamara Y. Washington
(74) *Attorney, Agent, or Firm* — Blank Rome LLP

(57) ABSTRACT

In one example, an on-mirror adaptive optics system may include a substrate including a deformable surface, a controller and a plurality of pockets defined in a substrate. Each of the pockets may include a an electrooptical sensor and an actuator. The controller may be communicatively coupled to the electrooptical sensor and the actuator. The controller may be configured to generate control voltages based on signals received from the electrooptical sensor to deform a portion of the deformable surface proximate a corresponding pocket of the plurality of pockets.

20 Claims, 12 Drawing Sheets

ON-MIRROR INTEGRATED ADAPTIVE OPTICS

BACKGROUND

Unless otherwise indicated herein, the materials described herein are not prior art to the claims in the present application and are not admitted to be prior art by inclusion in this section.

The present disclosure generally relates to deformable mirror integrated adaptive optics.

Adaptive optics (AO) is a technology used to improve the performance of optical systems by reducing the effect of wavefront distortions by deforming a mirror surface in order to compensate for these distortions. Adaptive optics systems are typically implemented by in-situ measuring wavefront distortions (also referred to as phase aberrations or phase errors) and compensating for them with a device that corrects those phase aberrations such as a deformable mirror (DM) or a liquid crystal phase spatial light modulator (LC phase SLM). Adaptive optics systems are used in astronomical telescopes for improving images of space objects, laser communications, remote power beaming and directed energy laser systems to mitigate the effects of atmospheric turbulence-induced distortions. In microscopy, laser material processing and in retinal imaging systems AO can reduce optical aberrations of optics (microscopy and retinal imaging) or the aberrations induced by the laser material processing beam and by environmental factors as in laser welding and additive manufacturing applications.

The subject matter claimed herein is not limited to implementations that solve any disadvantages or that operate only in environments such as those described above. Rather, this background is only provided to illustrate a few example technology areas where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one example, an on-mirror adaptive optics system may include a substrate including a deformable surface, a controller and a plurality of pockets defined in a substrate. Each of the pockets may include a an electrooptical sensor and an actuator. The controller may be communicatively coupled to the electrooptical sensor and the actuator. The controller may be configured to generate control voltages based on signals received from the electrooptical sensor to deform a portion of the deformable surface proximate a corresponding pocket of the plurality of pockets.

In another example, an on-mirror adaptive optics system may include a substrate including a deformable surface, a controller, and a plurality of pockets defined in a substrate. Each of the pockets may include an electrooptical sensor and an actuator. The controller may be communicatively coupled to the electrooptical sensor and the actuator. The controller may be configured to generate control voltages based on signals received from the electrooptical sensor to deform a portion of the deformable surface proximate a corresponding pocket of the plurality of pockets. The system may include transmitter or receiver optics optically coupled to the plurality of pockets.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to deformable mirror integrated adaptive optics.

Adaptive optics (AO) technology is used to improve the performance of optical systems by mitigating the effect of incoming wavefront distortions on system performance via real-time controllable deformation of reflective surface profile of one or more specially designed and manufactured mirrors, that is commonly known as deformable mirror (DM), in order to compensate for the phase distortions. Adaptive optics are typically implemented by measuring wavefront phase aberrations with a wavefront sensor and their mitigation with a device that corrects those errors, such as a deformable mirror or a liquid crystal (LC) phase spatial light modulator (phase LC SLM).

Figure 1:
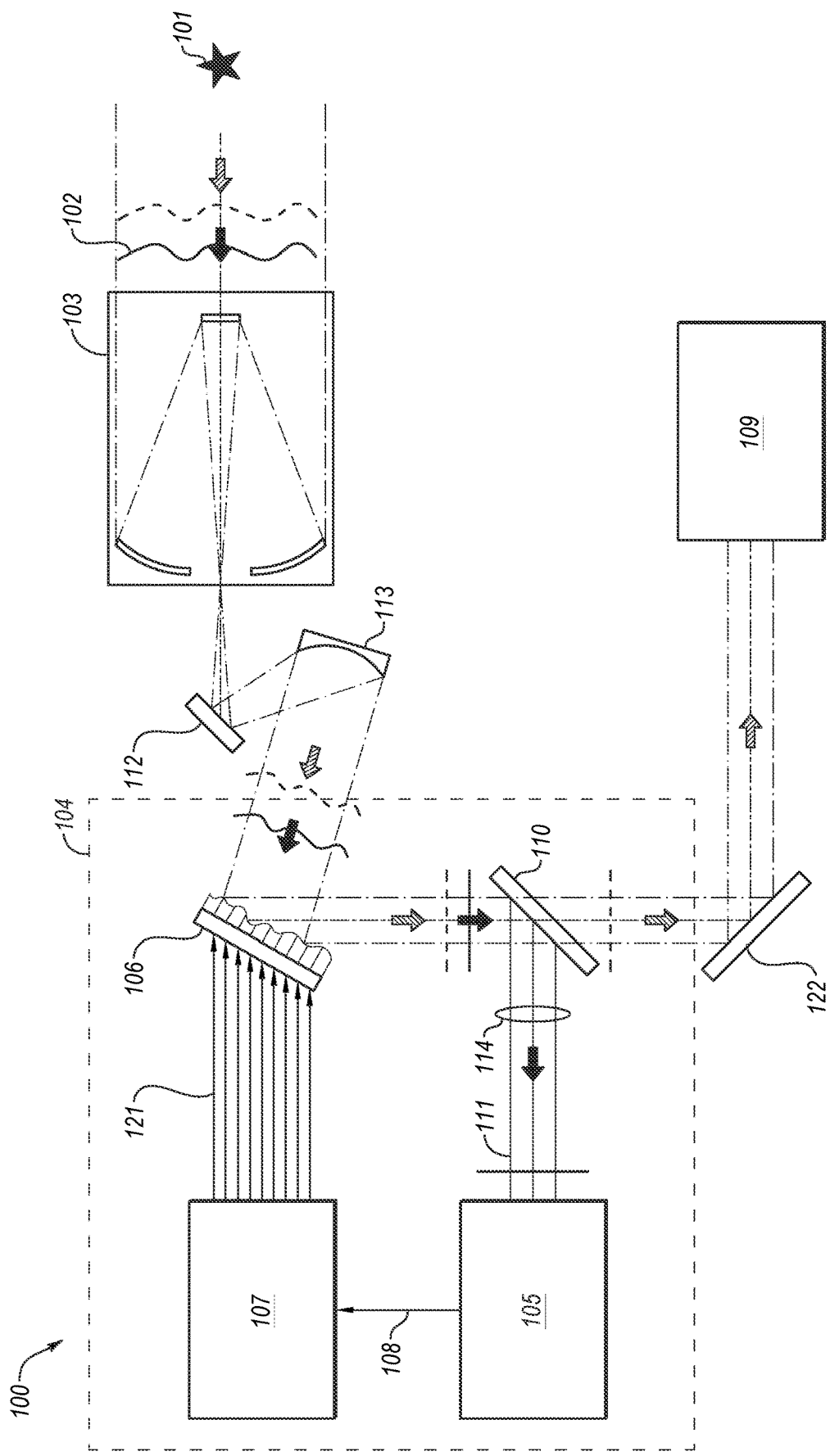
FIGS. 1-4 are perspective section views of examples of adaptive optics systems.

FIG. 1 is a perspective section view of an example of an adaptive optics (AO) system 100. As illustrated, in atmospheric sensing (e.g., imaging and laser communication) applications, when light from a star or a remotely located object 101 passes through the Earth's atmosphere, the wavefront phase of an optical wave 102 that enters an optical receiver optics 103 (e.g., an imaging or laser communication telescope), is perturbed or distorted. An AO system 104 of the system 100 is configured to correct these distortions (also known as phase aberrations), using an electrooptical sensor 105 such as wavefront sensor or metric sensor. A wavefront sensor may measure wavefront aberrations of the received optical wave 102 after it is reflected by a deformable mirror 106, also known as residual phase aberrations. The deformable mirror 106 is incorporated into the AO system 104 for phase aberration compensation, and a controller 107 receives input signals 108 from the electrooptical sensor 105. The Shack-Hartmann sensor is one type of wavefront sensor that may be used for adaptive optics, although others may be implemented.

The controller 107 calculates control voltages 121 based on the input signals 108 resulting in real-time reshaping of a surface of the deformable mirror 106 to optimally compensate the impact of wavefront aberrations of the optical wave 102 and improve a desired quality of optical field characteristics registered by an optical sensor 109. Examples of optical field characteristics include sharpness of an image of the object 101, or laser power coupled into a fiber and registered by a photo-detector in laser-based optical receiver systems. One example of a deformable mirror that may be implemented in AO systems is described in U.S. Pat. No. 7,967,456 entitled "Scalable Size Deformable Pocket Mirror with On-pocket Bimorph Actuator," which is incorporated by reference in its entirety.

In some adaptive optics systems, wavefront control is designed to compensate the incoming wavefront aberration $\varphi(r,t)$ within the telescope aperture, where $r=\{x,y\}$ is a coordinate vector in the plane of receiver aperture and t is time. In these phase-conjugate-type AO systems, AO control is performed via measurements of an uncompensated residual wavefront phase error $\delta(r,t)=\varphi(r,t)-u(r,t)$, where $u(r,t)$ is controllable wavefront phase modulation introduced by the deformable mirror. Note that optimal compensation corresponds to phase conjugation control: $u(r,t)=-\varphi(r,t)$.

To implement phase-conjugate AO control, the AO system 104 may include a number of optical elements such as a beam splitter 110 that diverts a portion 111 of the received optical wave 102 to the electrooptical sensor 105, and optical elements used for reimaging and scaling in size of the receiver telescope input aperture (pupil) into both the deformable mirror 106 and the electrooptical sensor 105) Such optical elements may include, for example, a beam steering component 112, an off-axis mirror 113 and a reimaging lens 114, and a mirror 122 as shown in FIG. 1. The optical elements of the AO system 104 including the deformable mirror 106, and the electrooptical sensor 105 may be carefully aligned and may be protected from impact of environmental factors (e.g., vibrations, thermal expansions, etc.). Since many adaptive optics systems include a significant number of optical elements, such adaptive optics systems are often bulky, heavy, expensive, difficult to align, operate and maintain.

Similar problems exist for integration of an AO hardware into laser transmitter and transceiver systems that are used for directed energy, remote power beaming and laser communications applications. These applications may also include laser material processing, additive manufacturing, lidars, active imaging and laser vibrometers.

Figure 2:
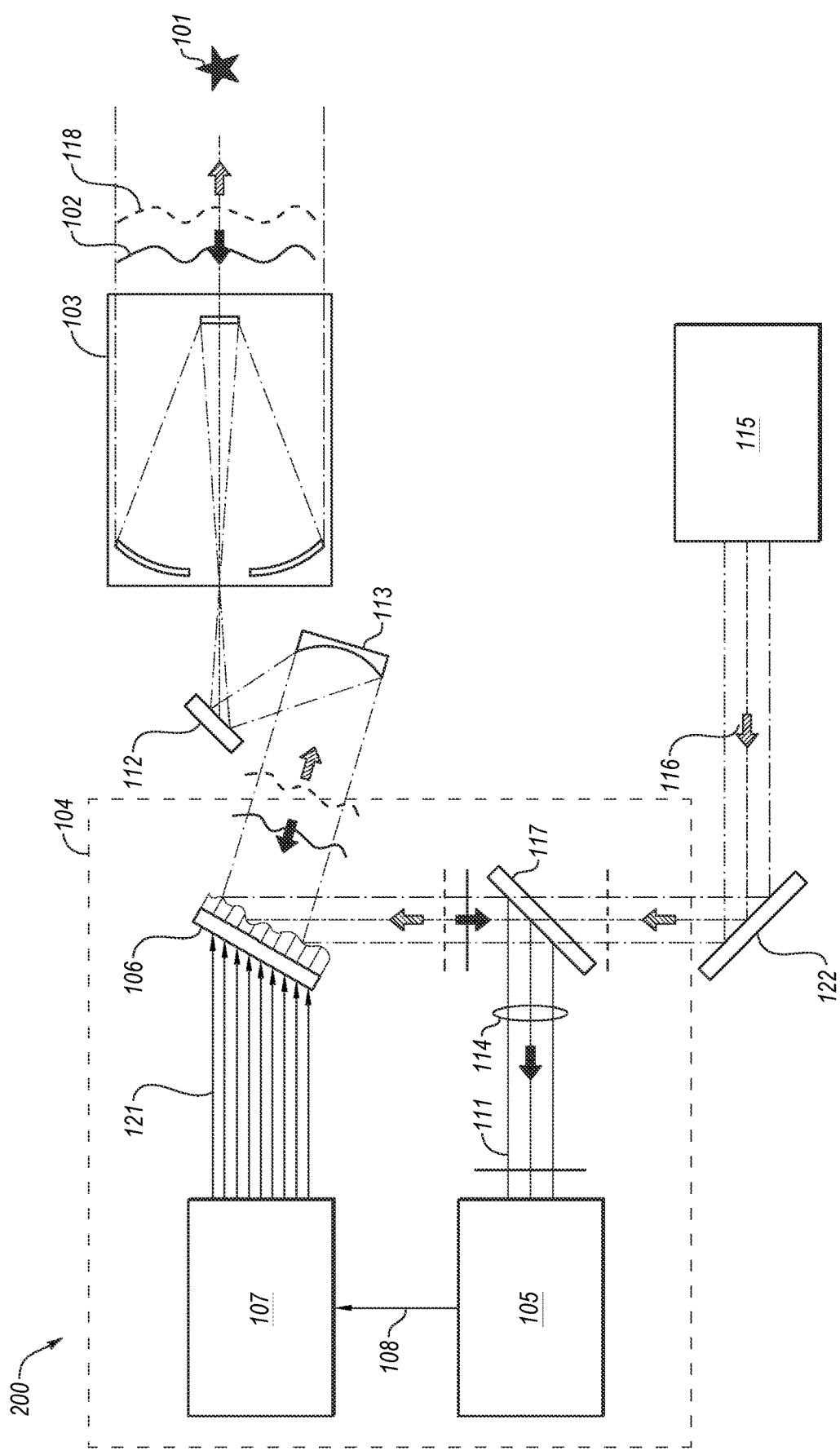

FIG. 2 is a perspective section view of another example of an adaptive optics (AO) system 200. In particular, FIG. 2 is an example of a laser transceiver system with AO wavefront control. As shown, the system 200 may include a laser source with a beam forming optical system 115 generates a laser beam 116 that passes through a dichroic beam splitter 117 and is reflected by the deformable mirror 106 of the AO system 104. In such configurations, the optics 103 may be used to receive the optical wave 102 as well as transmit an outgoing laser beam 118. The deformable mirror 106 may introduce wavefront phase modulation $u(r,t)$, that provides pre-compensation of phase aberrations of the outgoing laser beam 118 via sensing of the residual aberrations of the received optical wave 102 with the electrooptical sensor 105.

In some laser transceiver systems, separation of a relatively high-power transmitted and low-power received light coming from the object 101 or a remote laser transceiver may be achieved by using slightly different wavelengths for the outgoing and received optical waves. In the AO system 104 in FIG. 2, the dichroic beam splitter 117 redirects the received optical wave 102 to the electrooptical sensor 105, while the transmitted laser beam 116 passes through the dichroic beam splitter 117. In directed energy applications this wavelength separation may be accomplished using an external laser illuminator operating at a wavelength $\lambda_{ILL}$ that is slightly different from the wavelength of the transmitted high-energy laser (HEL) beam $\lambda_{HEL}$ In laser communications systems, wavelength separation may be achieved using remotely operating laser transceivers with laser sources having somewhat different wavelengths. In the case of broad band received wave, which may be used, for example, in laser material processing and additive manufacturing applications, the dichroic beam splitter 117 may be configured to reflect optical waves scattered off the material (processing light) within a selected wavelength band and transmit the main high-energy laser beam wavelength.

In another AO system type, the pre-compensation of the outgoing beam's phase aberration may be performed using optimization of a measured signal that is proportional to one or another received light characteristic (control metric), for example power within the receiver aperture (power-in-the-bucket metric, $J_{PIB}$), or power coupled into a fiber (power-in-the-fiber, $J_{PIF}$), or metrics based on different statistical characteristics of backscattered speckle field (speckle metrics). These types of AO systems may also be known as metric optimization AO or wavefront sensor-less AO.

Figure 3:
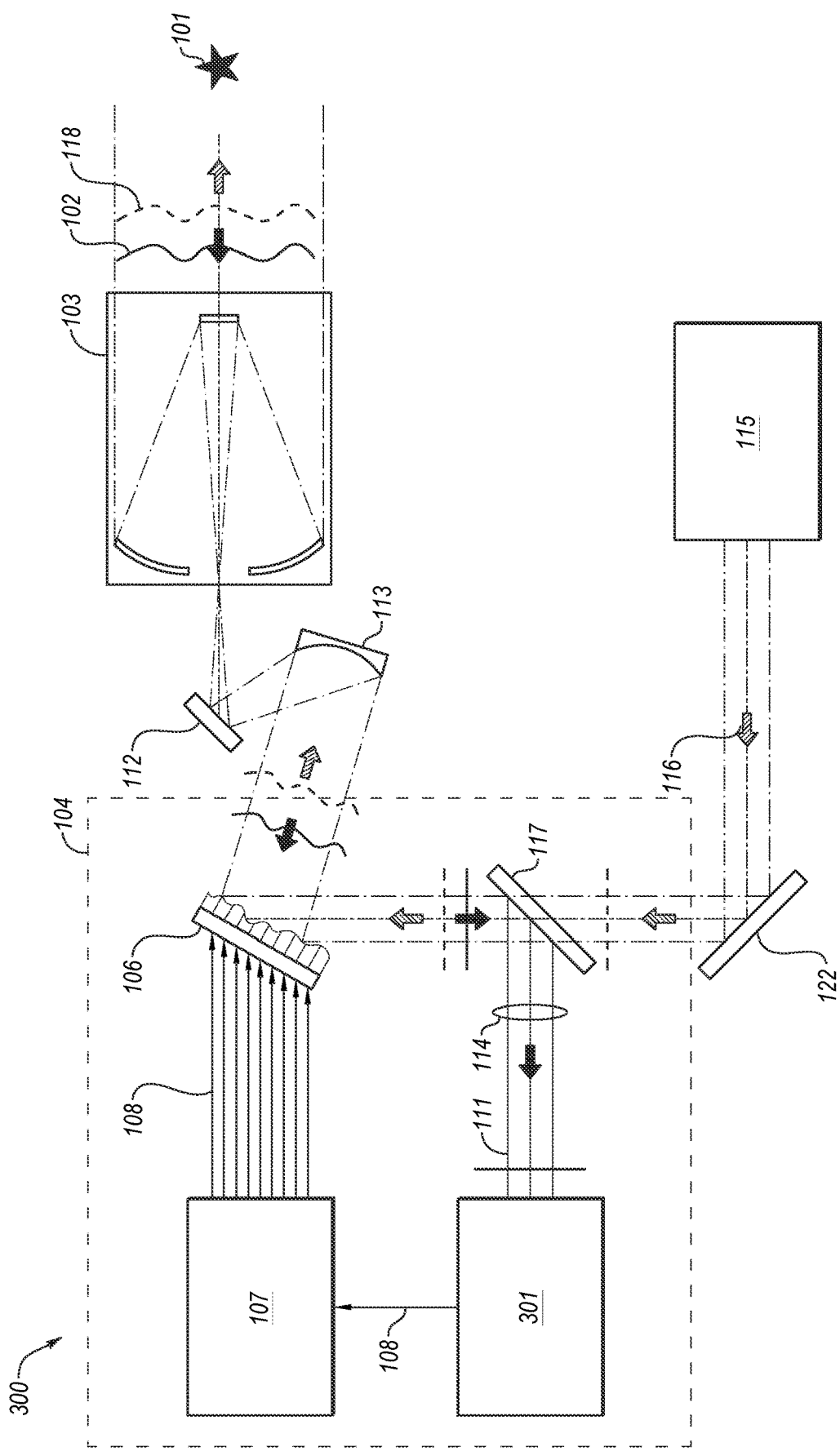

FIG. 3 is a perspective section view of another example of an adaptive optics (AO) system 300. In particular, FIG. 3 illustrates a metric optimization AO system that shares an optical train for both the transmitted and received light. In such configurations, the electrooptical sensor 105 may include a metric sensor 301 as shown, rather than a wavefront sensor.

Figure 4:
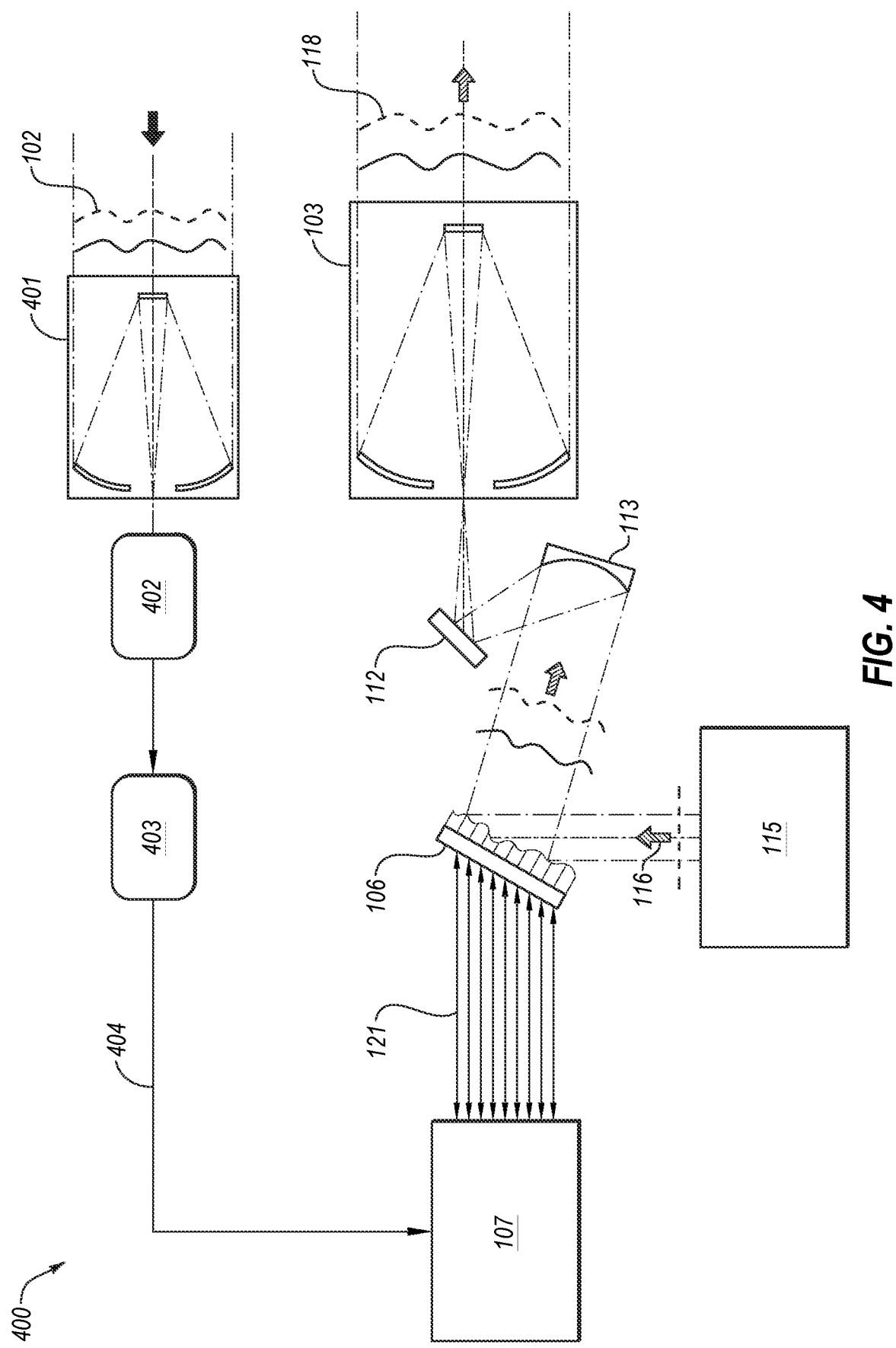

FIG. 4 is a perspective section view of another example of an adaptive optics (AO) system 400. As shown, in some configurations the metric optimization-based AO system 400 may be simplified by separating transmitter and the receiver optics (e.g., telescopes). In particular, the system 400 may include the transmitter optics 103 and receiver optics 401.

In the illustrated configuration, the received optical wave 102 may be measured by a photo-receiver 402 (e.g., photo-detector or photo-detector array), and processed by a control metric sensor 403. The computed control metric 404 may be sent to the controller 107. The controller 107 may compute control voltages 121 applied to the deformable mirror 106 using one or more metric optimization algorithms (e.g. the stochastic parallel gradient descent (SPGD)) to maximize or minimize the control metric 404. Although the optical train of the system 400 shown is simpler if compared to the system 300 with shared transmitter-receiver aperture in FIG.

3, the additional receiver optics 401 increases the overall system complexity, weight and cost.

In summary, AO control architectures described with respect to FIGS. 1-4 may require installation and alignment of a large number of optical elements, resulting in substantial increase of the entire system size, weight and cost. This also makes the entire system highly sensitive to vibrations, "high g" and high-thermal gradient environmental factors. Accordingly, the disclosed embodiments include robust beam and wavefront control capabilities integrated directly to a DM thus addressing the challenges and drawbacks of the existing AO systems.

These drawbacks could be resolved using the on-mirror-integrated methods and devices disclosed herein.

In the disclosed on-mirror-integrated AO system (both wavefront and control metric optimization types) wavefront control and sensing capabilities are directly integrated into the specially designed adaptive optics embodiments. The described AO embodiments may be integrated, for example, on a on optical receiver or transmitter telescope primary mirror or secondary mirror. Such configurations may be referred to as on-mirror adaptive optics (OMAO) systems. The OMAO system provides significantly simpler, robust and more compact AO solution compared with AO technologies described above and may be applied for instance to or fiber array-based laser beam transmitters, astronomical telescopes, free-space communication terminals and beam management systems used for laser material processing and additive manufacturing.

Figure 5:
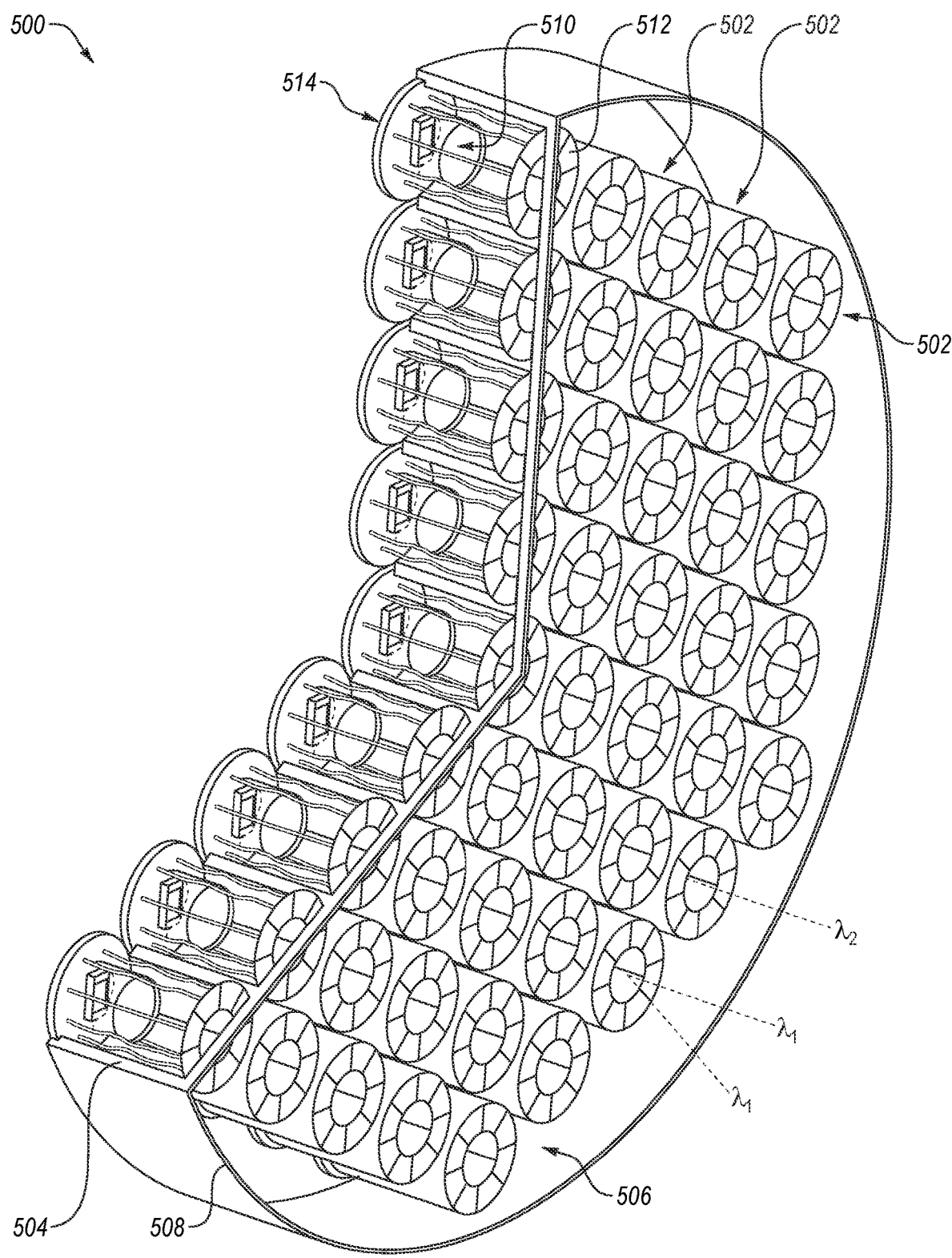
FIG. 5 is a perspective section view of an example of an on-mirror adaptive optics component.
Figure 6:
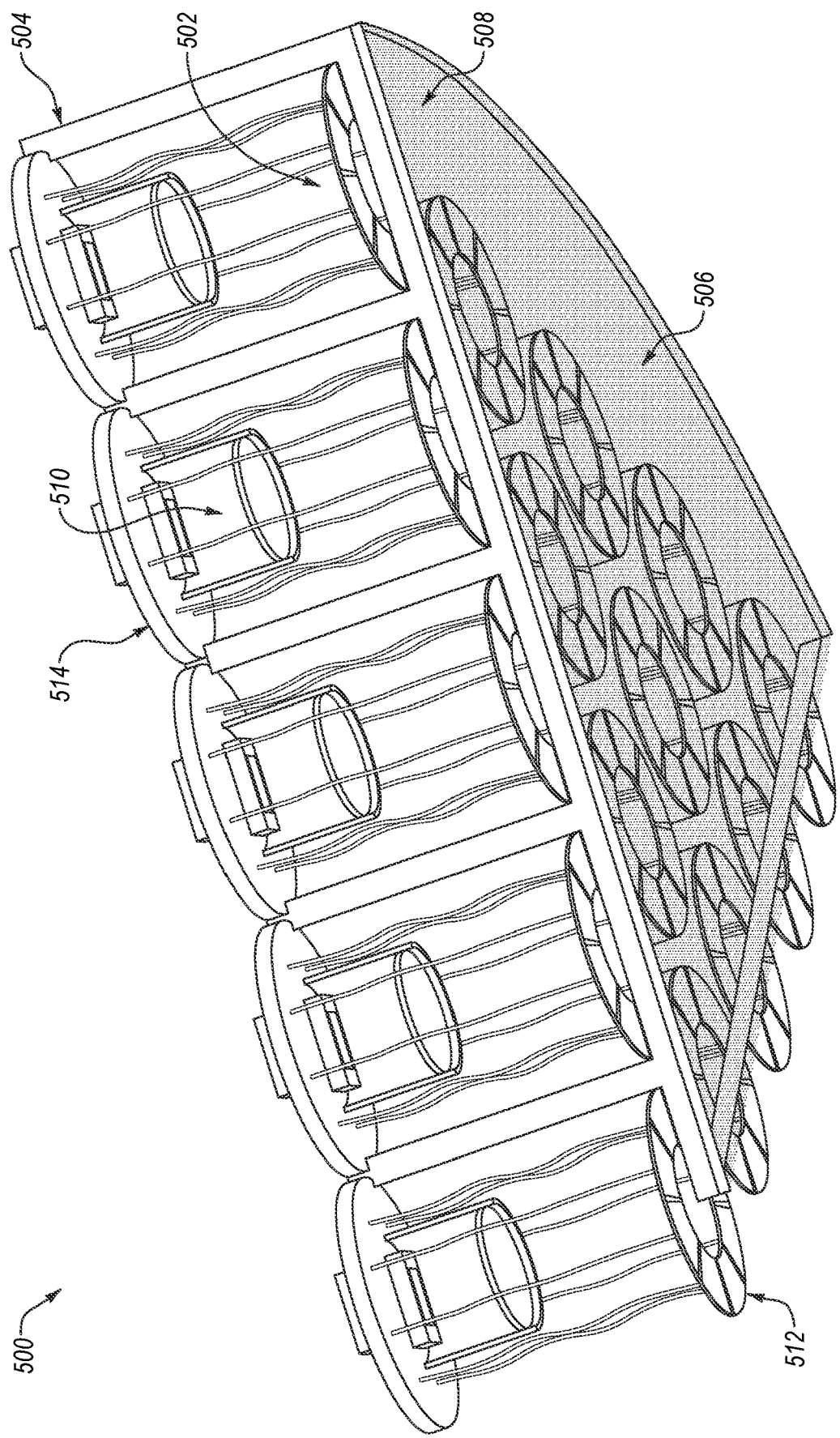
FIG. 6 is another perspective section view of the on-mirror adaptive optics component.

FIG. 5 is a perspective section view of an example of an OMAO component 500. FIG. 6 is another perspective section view of the OMAO component 500. As illustrated, the OMAO component 500 may include multiple sub-apertures or pockets 502 (only three of which are labeled for simplicity). The pockets 502 may be formed in any suitable manner, for example, by making cuts in a substrate 504. Accordingly, the pockets 502 may be defined in the substrate 504. The substrate 504 may include a surface 506 which may be optically polished. In some configurations, a surface material may be deposited on the surface 506, and the surface material may be transparent or reflective, depending on an angle of incidence of light (see, for example, FIG. 6). In some aspects, the substrate 504 may include glass and/or other appropriate materials.

The surface 506 of the substrate 504 may include a dielectric layer 508 configured to transmit certain wavelengths of optical signals and reflect other wavelengths of optical signals. As shown, optical signals having wavelength $\lambda_1$ are reflected by the dielectric layer 508 and optical signals having wavelength $\lambda_2$ are transmitted by the dielectric layer 508 and may proceed into the pockets 502. Thus, the surface 506 may act as a dichroic mirror by reflecting desired certain wavelengths of optical signals and transmitting another desired wavelengths.

Each of the pockets 502 may include wavefront or control metric signal sensing, controllable bending of the pocket front surface, and/or computation of control signals based on in-pocket measurements. Such aspects will be described in further detail below.

In particular, as shown, the pockets 502 may include an in-pocket sensor 510 (e.g., an optical sensor, a wavefront sensor or a metric sensor), that measures optical signal characteristic of the light at wavelength $\lambda_2$ that enters the pocket 502. In some aspects, the in-pocket sensor 510 may be a Shack-Hartman sensor, a power-in-the-bucket sensor, or a speckle-metric sensor, although other configurations may be implemented. The in-pocket sensor 510 may be used to detect aberrations or distortions in the optical signals which may be caused by the optical signals travelling through the atmosphere or other factors, or measure characteristics of light which are dependent on these aberrations.

The pockets 502 may include one or more actuators 512. The actuator 512 may be configured to deform a portion of the surface 506 to compensate for aberrations or distortions (e.g., using signals detected by the in-pocket sensor 510). In particular, the actuator 512 may deform a portion of the surface 506 proximate to (or over) each of the corresponding one of the pockets 502. The deformation in the surface 506 caused by the actuator 512 may change the optical signals reflected by the dielectric layer 508 in a manner that compensates for the wavefront phase aberrations or distortions.

In one example, the actuator 512 may be a multi-electrode bimorph element. In some aspects, the multi-electrode bimorph element may include a piezo-ceramic material bonded to a surface of each of the pockets 502, and actuated by applying control voltages to electrodes of the multi-electrode bimorph element. Additional aspects of deformable mirrors and associated actuators are described in further detail in U.S. Pat. No. 7,967,456 entitled "Scalable Size Deformable Pocket Mirror with On-pocket Bimorph Actuator," which is incorporated by reference in its entirety. The actuator 512 may include any suitable aspects described in the above-mentioned document. However, the actuator 512 and associated deformable mirror surface 506 may include certain differences, as will be described in further detail below.

Each of the pockets 502 may each include an electronic circuit or circuit board 514. In some configurations, the circuit board 514 may be included as part of the in-pocket sensor 510. The circuit board 514 may include various electronic components, for example, to sense aberrations or distortions in optical signals received at each corresponding one of the pockets 502.

Figure 7:
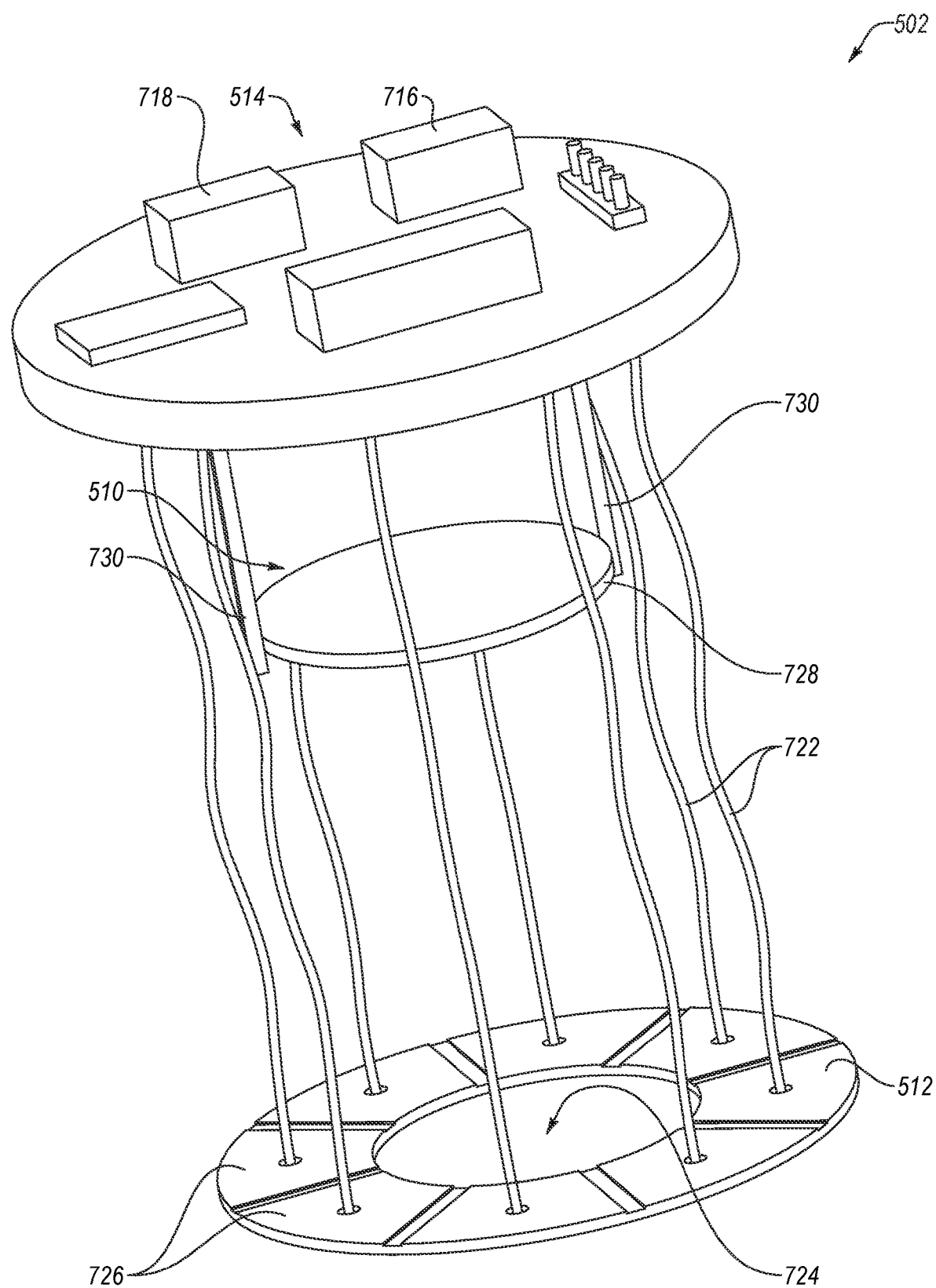
FIG. 7 is a perspective view of a portion of one of the pockets of the on-mirror adaptive optics component.
Figure 8:
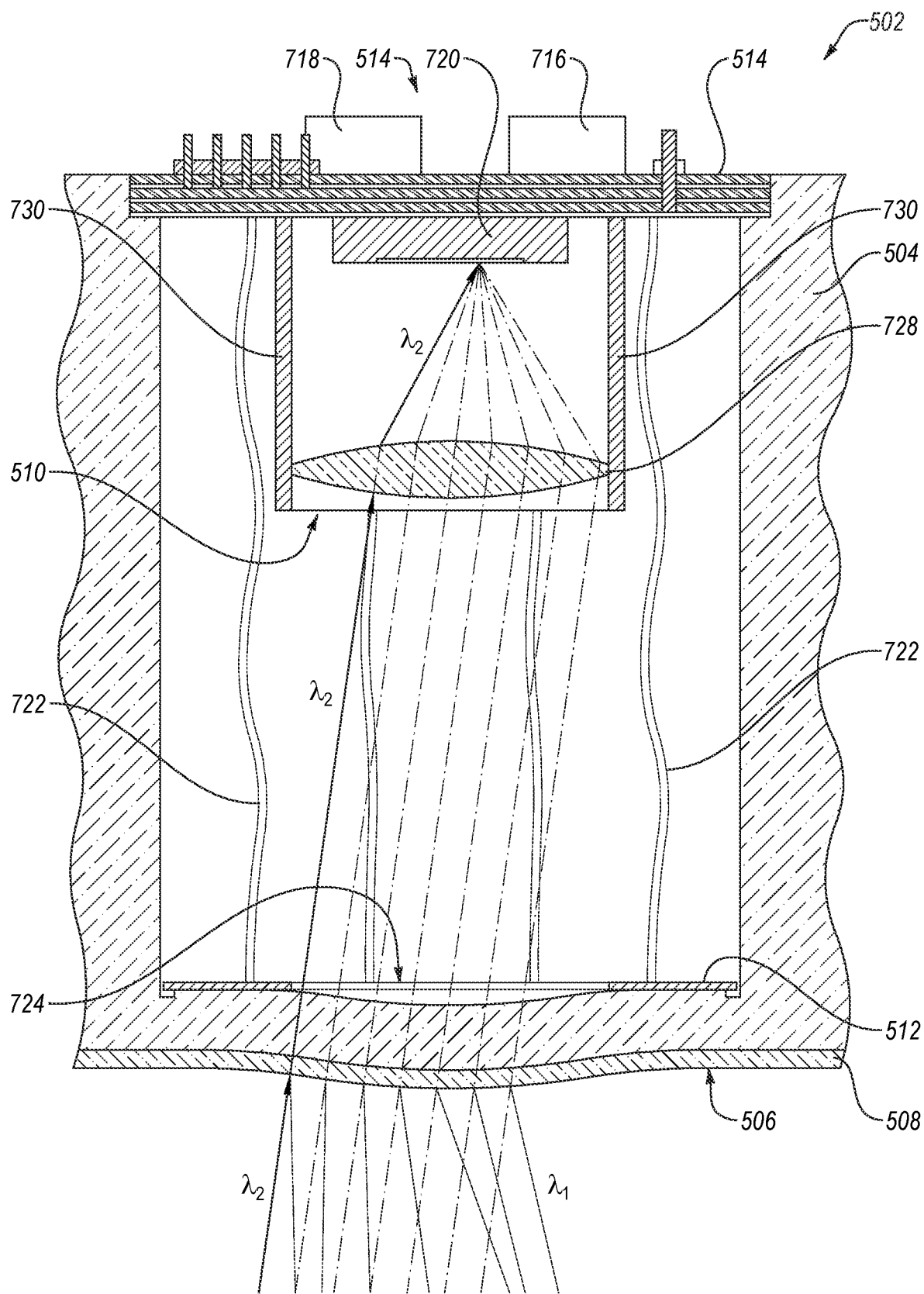
FIG. 8 is a section view of a portion of one of the pockets of the on-mirror adaptive optics component.

FIG. 7 is a perspective view of a portion of one of the pockets 502 and FIG. 8 is a section view of a portion of one of the pockets 502. With attention to FIGS. 7 and 8, the pockets 502 will be described in further detail. As shown, the actuator 512 or a plurality of actuators may be electrically coupled to the circuit board 514 by electrical couplings 722. In the illustrated configuration, the electrical couplings 722 are wires extending between the circuit board 514 and the actuator 512, although any suitable electrical coupling may be implemented. The actuator 512 defines an opening 724 to permit optical signals to travel into the pocket 502 (e.g., through the dielectric layer 508 on the surface 506).

The in-pocket sensor 510 may include one or more optical components 728 to transform optical signals travelling through the pocket 502, for example, a lenslet array corresponding to the Shack-Hartmann wavefront sensor, or a lens corresponding to a power-in-the-bucket metric sensor or speckle metric sensors. Accordingly, the circuit board 514 may include photo-detector or photo-detector array receiving the light transformed by optical component 728 of the in-pocket sensor 510 and provide electrical coupling of the corresponding in-pocket sensor 510 and the actuators 512. The circuit board 514 may receive electrical signals representative of the optical signals received at the pocket 502 from the in-pocket sensor 510. Further, the circuit board 514 may process the electrical signals to obtain control voltages sent to the actuators 512 to compensate for wavefront phase aberrations of the optical wave entering the pocket 502. The circuit board 514 may include control electronics configured to actuate or control the actuator 512 to deform the surface 506 in a manner to compensate for the aberrations.

As mentioned above, the circuit board 514 may include various electronic components which may be positioned on a circuit board (e.g., a printed circuit board or the like). As shown, the circuit board 514 may include a controller 716 and/or a receiver processor 718. The receiver processor 718 may be electrically coupled to a receiver or a receiver array 720, shown in FIG. 8. The receiver 720 may receive optical signals travelling through the pocket 502 and may generate electrical signals representative of the optical signals. Accordingly, the receiver 720 may be an optoelectronic component that converts optical signals to electrical signals.

The controller 716 may be configured to receive electrical signals from the receiver 720, process these signals and send the processed electrical signals to actuate the actuator 512. Further, the receiver processor 718 and/or the controller 716 may detect aberrations or distortions in the optical signals travelling through the pocket 502 that are received at the receiver array 720. The controller 716 may then generate electrical signals to compensate for the aberrations or distortions and transmit the electrical signals to the actuator 512 (e.g. control voltages for the electrodes of the actuator 512).

As shown, the actuator 512 includes a plurality of electrodes 726. In the illustrated configuration, the electrodes 726 are arranged in a circular pattern around the opening 724. Thus, the electrodes 726 may define the opening 724. However, other suitable configurations may be implemented. The electrodes 726 may be configured to deform the deformable surface 506 when electrical signals (e.g., electrical currents or control voltages) are provided to the electrodes 726, for example, from the controller 716. The electrical signals may be provided to the electrodes 726 via the electrical couplings 722. Accordingly, as illustrated, one of the electrical couplings 722 may be included for each of the electrodes 726, although other configurations may be implemented.

As mentioned above, the in-pocket sensor 510 may include the optical component 728, the receiver 720 and the receiver processor 718, which may measure optical signals and transform them to electrical signals. The controller 716 may receive the electrical signals and generate control signals for the actuators 512 of the pocket 502. The in-pocket sensor 510 may include the optical component 728 or plurality of optical elements configured to focus, direct, or modulate the optical wave travelling through the pocket 502 and the receiver 720 configured to detect the optical signals after passing through the optical component 728. The optical component 728 may be supported by support members 730. As illustrated, the support members 730 affix the optical component 728 to the circuit board 514, although other configurations may be implemented. For example, the support members 730 may affix the optical component 728 to the substrate 504. In other configurations, the support members 730 may not be included, for example, if the optical component 728 is formed in or affixed directly to the substrate 504.

As shown, for example, in FIG. 8, the optical signals with wavelength $\lambda_2$ are transmitted through the dielectric layer 508 into the pocket 502, pass through the optical component 728 of the in-pocket sensor 510 and are received at the receiver 720, which converts the optical signals to electrical signals. The electrical signals are then processed by the receiver processor 718 and the controller 716 generates electrical signals to actuate the actuator 512 to compensate for aberrations or distortions in the optical signals with wavelength $\lambda_1$ that is reflected by the dielectric layer 508 on the surface 506. The actuator 512 may deform the deformable surface 506 based on the electrical signals from the controller 716, which in turn changes the wavefront of the optical signals with wavelength $\lambda_1$ which are reflected by the dielectric layer 508 on the surface 506.

As shown, the actuator 512 deforms the deformable surface 506 proximate to or over the opening 724. In particular, the actuator 512 deforms the deformable surface 506 in an area in proximate vicinities of the electrodes 726. This permits the optical signals $\lambda_2$ to travel through the pocket 502 to the optical component 728 and the receiver 720, while the optical signals $\lambda_1$ are reflected and adjusted in wavefront phase by the deformable surface 506 as they are reflected. Such configurations may permit the in-pocket sensor 510 and the control electronics on the circuit board 514 to be incorporated in each of the pockets 502 individually. Additionally or alternatively, such configurations may provide additional degrees of freedom for compensation of atmospheric effects or other aberrations by providing sensing and control components as part of the pocket 502 itself.

In the configuration illustrated in FIGS. 5, 6, 7 and 8, each of the pockets 502 includes a dedicated one of the controllers 716 and a dedicated one of the receiver processors 718. However, in other configurations the controllers 716 and/or the receiver processors 718 may be positioned external or remote with respect to the pockets 502. In such configurations, a single controller and/or the receiver processor may operate with multiple pockets 502. For example, one receiver processor may receive and process optical signals from multiple in-pocket sensors 510 of the multiple pockets 502. Further, in some configurations one controller may generate electrical signals for multiple actuators of multiple pockets.

Thus, the controller may be communicatively coupled to the electrooptical sensor and the actuator, and the controller may be configured to generate control voltages based on signals received from the electrooptical sensor to deform a portion of the deformable surface proximate a corresponding pocket of the plurality of pockets.

Figure 9:
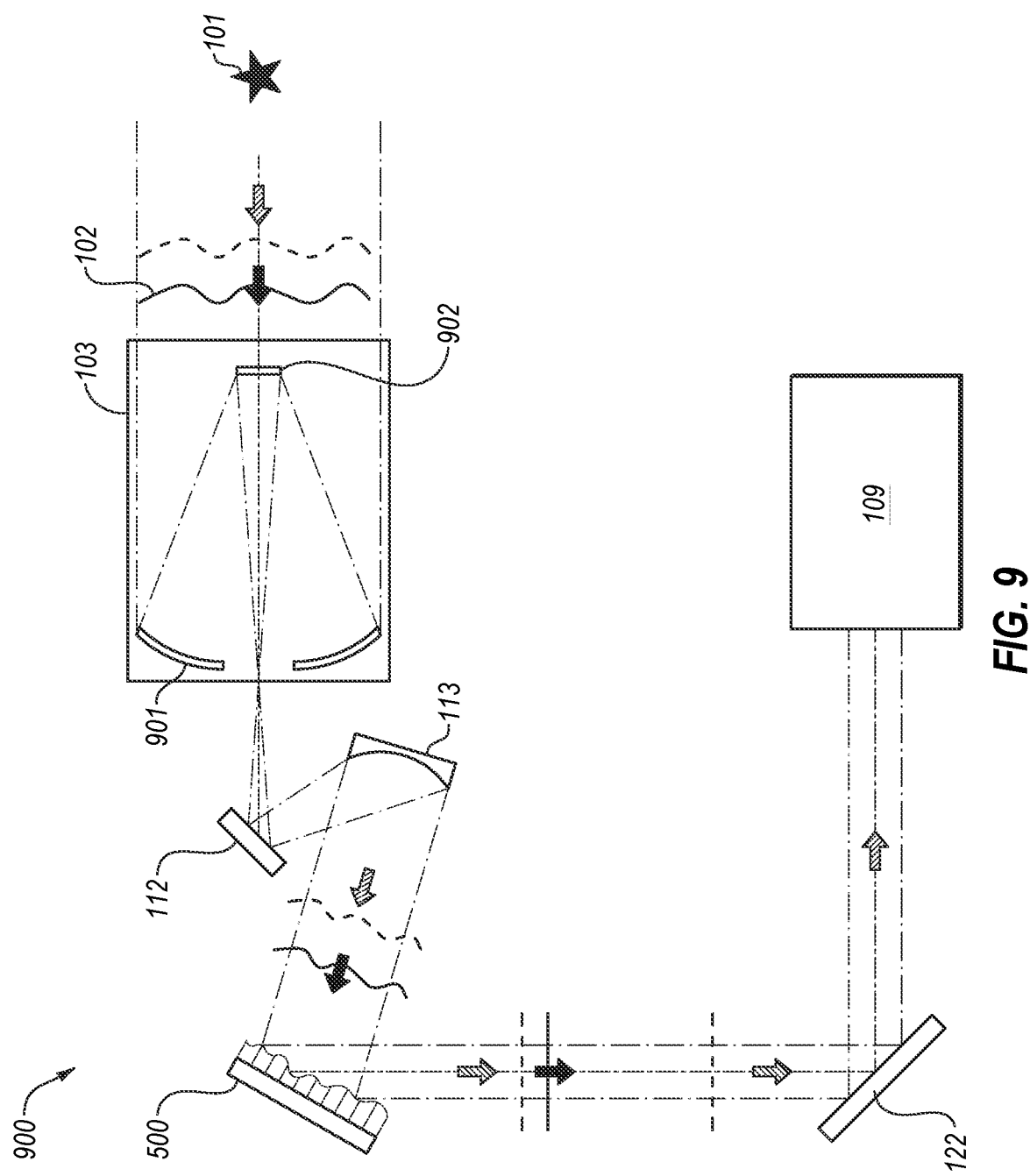
FIGS. 9-12 are perspective section views of examples of on-mirror adaptive optics systems.

FIG. 9 is a perspective section view of another example of an on-mirror adaptive optics (OMAO) system 900. The illustrated example may include any suitable aspects described above with respect to FIGS. 1-3. However, the OMAO system 900 also includes the OMAO component 500 described with respect to FIGS. 5-8. In the illustrated example, the adaptive optical receiver configuration may be based on a phase-conjugate type control system architecture. In such configurations, the OMAO component 500 may provide measurements of phase aberrations of the received optical wave 102 inside each pocket 502 and may compute control voltages applied to the actuator 512 to compensate for these aberrations inside each pocket 502, for example, as illustrated in FIG. 9.

As shown, the OMAO component 500 may be implemented instead of the AO system 104 described with respect to FIGS. 1-3. In comparison with the OMAO system 100 of FIG. 1, integration of the OMAO component 500 results in significant simplification of the entire optical train, reduction of system weight, cost and robustness. In this OMAO component application the in-pocket sensor 510 may be represented by a Shack-Hartman, or any other wavefront sensor that provides measurements of wavefront aberrations.

As shown in FIG. 9, the optics 103 may include a primary mirror 901 and a secondary mirror 902. In some configurations, the OMAO component 500 may be integrated into the optics 103. For example, the OMAO component 500 may be implemented in the primary mirror 901 or the secondary mirror 902 or both. Such configurations may result in an even more compact optical receiver system.

Figure 10:
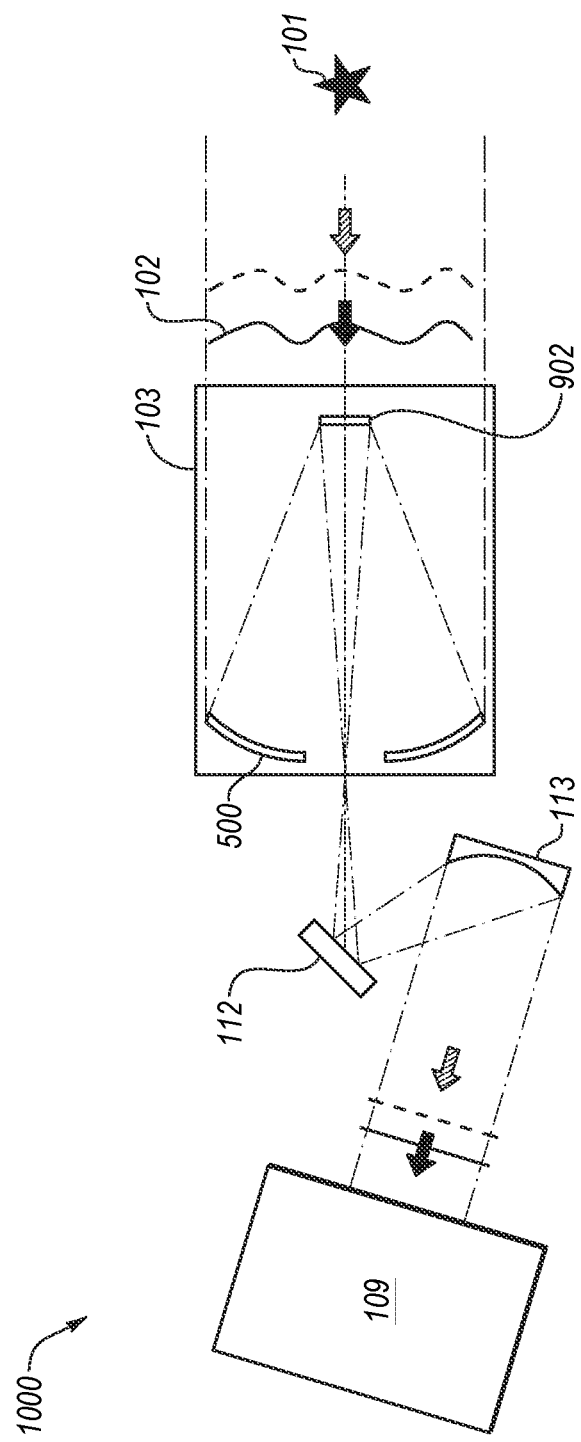

FIG. 10 is a perspective section view of another example of an on-mirror adaptive optics (OMAO) system 1000. FIG. 10 illustrates the OMAO component 500 integrated into the optics 103, and in particular, in the receiver telescope primary mirror (corresponding to primary mirror 901 in FIG. 9).

In some configurations, the OMAO component 500 may be used to significantly simplify the transceiver OMAO system 200 described with respect to FIG. 2. Such configurations may be implemented in high energy laser (HEL) beam projection, laser communications, laser material processing and laser additive manufacturing In such configurations, the optics 103 (which may also be referred to as beam director (BD)), may transmit a laser beam at wavelength $\lambda_1$ that is reflected off dielectric layer 508 of the OMAO component 500. The optics 103 may also receive light at a different wavelength $\lambda_2$ which originates from the object 101.

In free-space laser communication applications, the light may be received from another laser communication terminal. In HEL directed energy applications, the light may be reflected off a target surface illuminated by a laser illuminator. In power beaming or laser communication applications, a laser beacon light may be used for sensing turbulence-induced aberrations. In laser material processing and additive manufacturing applications, a processing light generated by HEL beam may be used on a material to process the material.

Figure 11:
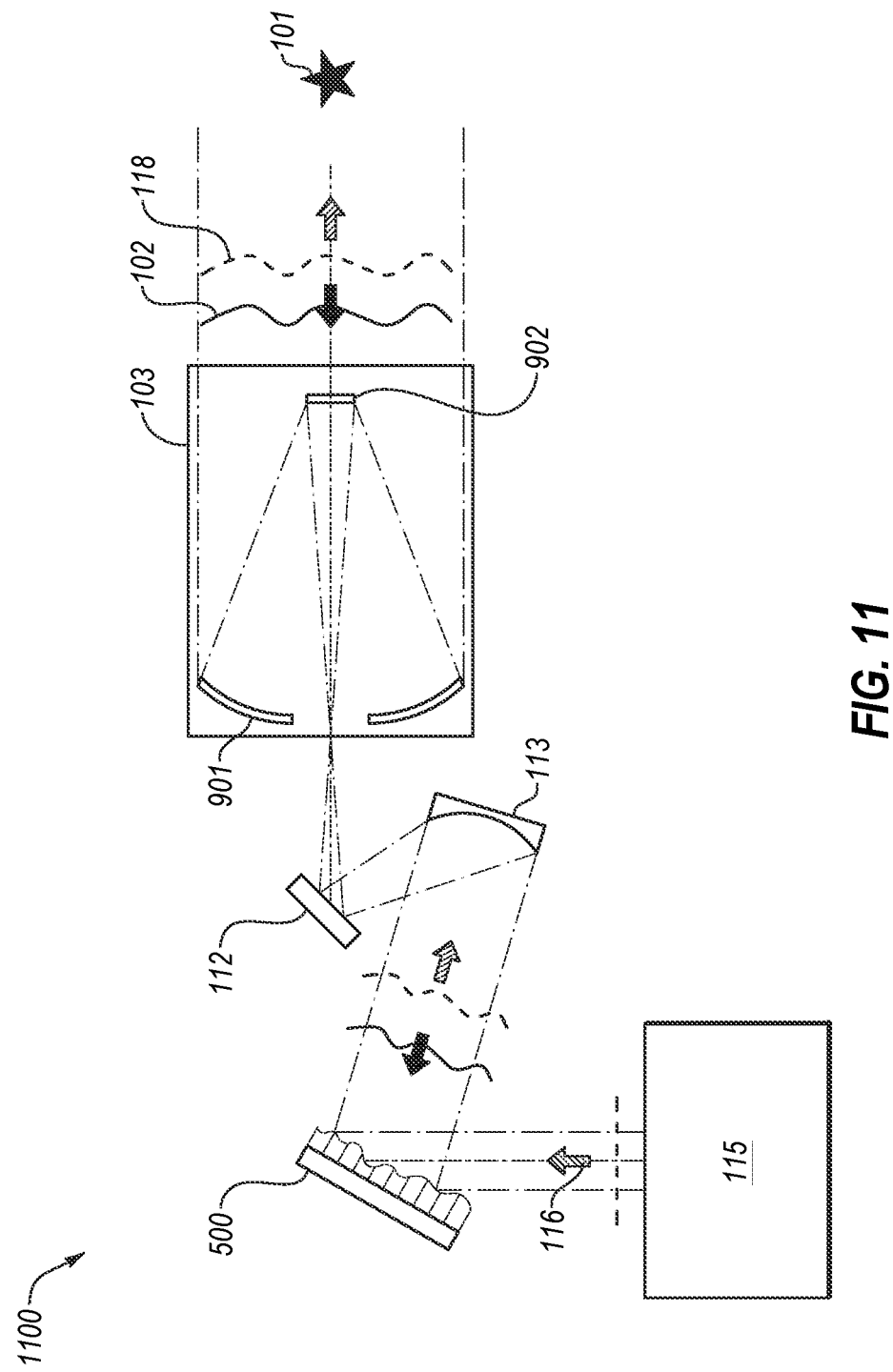

FIG. 11 is a perspective section view of another example of an on-mirror adaptive optics (OMAO) system 1100. In the illustrated configuration, light at wavelength $\lambda_2$ may enter the optics 103 and may pass through the dielectric layer 508 of the OMAO component 500 and may propagate into the in-pocket sensors 510. The in-pocket sensors 510 may be configured to measure wavefront aberrations light at wavelength $\lambda_2$ entering the pockets 502 of the in phase-conjugate type control configurations of the OMAO component 500.

Additionally or alternatively, the in-pocket sensors 510 may be configured to measure one or more received light characteristics (e.g., a control metric), in metric optimization type control configurations of the OMAO component 500. For example, the control metric may include power within the receiver aperture (e.g., a power-in-the-bucket metric, $J_{PIB}$), or metrics based on different statistical characteristics of target backscattered light (e.g., speckle metrics) entering the optics 103. In some embodiments, the OMAO system 1100 of FIG. 11 may be further simplified via integration of the OMAO component 500 into the primary mirror 901, the secondary mirror 902 or both.

In the configuration illustrated in FIGS. 9, 10 and 11, each of the pockets 502 may include a dedicated one of the controllers 716 and a dedicated one of the receiver processors 718. However, in other configurations the controllers 716 and/or the receiver processors 718 may be positioned external or remote with respect to the pockets 502. In such configurations, a single controller and/or the receiver processor may operate with multiple pockets 502. For example, one receiver processor may receive and process optical signals from multiple in-pocket sensors 510 of multiple pockets 502. Further, one controller may generate electrical signals for multiple actuators of multiple pockets.

Figure 12:
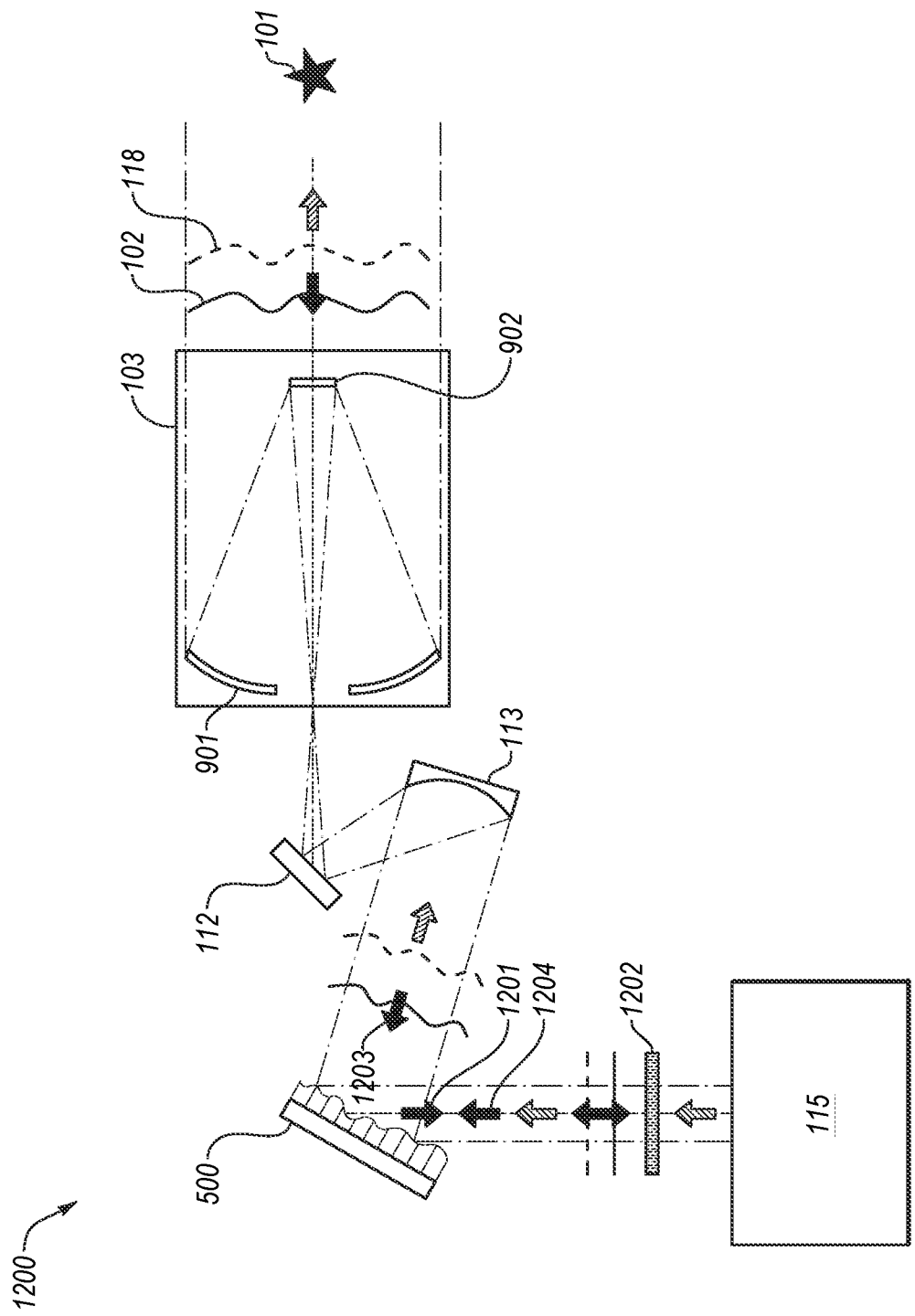

FIG. 12 is a perspective section view of another example of an on-mirror adaptive optics (OMAO) system 1200. As illustrated, in some configurations the OMAO component 500 may be implemented to measure uncompensated (e.g., residual) phase aberrations or control metrics dependent on the residual phase aberrations of the received optical wave 102 inside each pocket 502. In addition, the OMAO component 500 may compute control voltages applied to the actuator 512 to compensate these residual phase aberrations inside the vicinity of each pocket 502 of the OMAO component 500.

In such adaptive optics control system configurations, the received light at wavelength $\lambda_2$ may be partially reflected from the dielectric layer 508 of the OMAO component 500. In such configurations, the dielectric layer 508 may be configured to be semitransparent for wavelength $\lambda_2$ and highly reflective for wavelength $\lambda_1$. The optical wave 102 with externally aberrated phase $\varphi(r,t)$ may be received by the optics 103. The deformable surface 506 of the OMAO component 500 may provide additional phase modulation $u(r,t)$, (e.g., controllable wavefront phase modulation). An optical wave 1201 may be reflected by the OMAO component 500 and may include uncompensated wavefront phase aberrations (e.g., phase error) $\delta(r,t)=\varphi(r,t)-u(r,t)$ and may be reflected by a dichroic mirror 1202 that is transparent for the transmitted laser beam wavelength $\lambda_1$ and reflective for wavelength $\lambda_2$. An optical wave 1204 may be reflected by the dichroic mirror 1202 and may propagate back to the OMAO component 500 and may enter one or more of the pockets 502.

The in-pocket sensors 510 may be configured to provide measurements of uncompensated residual wavefront phase error $\delta(r,t)=\varphi(r,t)-u(r,t)$ characteristics or control metrics dependent on the uncompensated aberrations inside each of the pockets 502. The corresponding controller 716 may be configured to mitigate the phase error $\delta(r,t)$ within each pocket using one or more phase conjugation or metric optimization control algorithms. The in-pocket sensor 510 may be configured to measure characteristics (e.g., wavefront aberrations and/or control metrics) of the optical wave 1201 that is reflected from both the OMAO 500 and the dichroic mirror 1202, and to mitigate potential negative impacts of a portion of the received optical wave 1203 that enters the pockets 502 prior to reflection by the OMAO component 500. This may be achieved, for example, by using difference in incidence angles of the optical waves 1203 and 1201. The use of the angle of incidence as a discriminator may be achieved by any suitable configuration. For example, via incorporation of angular selective diffractive optics or holographic element into each pocket 502. In such configurations, only light coming from the direction of the reflected wave 1204 may enter the in-pocket sensor 510 and the receiver 720, while all optical signals such as 1203 that enter at different angles are diffused inside the pocket 502 and do not affect the measurements. This angular selectivity may be also achieved with other configurations of the receiver 720 or other components.

If the OMAO component 500 is configured for a fiber collimator array based laser system, the pocket mirror array geometry may match the fiber-collimator array, so that each optical signal transmitted by the fiber array sub-aperture beam (beamlet) enters the corresponding pocket region of the OMAO component 500, and is reflected from the window of the pocket 502. In this configuration, the OMAO component 500 may provide enhancement of wavefront aberration capabilities of fiber array systems by providing wavefront aberration pre-compensation within each sub-aperture.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An on-mirror adaptive optics system comprising:
   a substrate including a deformable surface; and
   a controller;
   a plurality of pockets defined in the substrate, each of the pockets comprising:
   an electrooptical sensor; and
   an actuator, wherein the actuator comprises a plurality of electrodes arranged in a circular pattern around an opening of the corresponding pocket of the plurality of pockets;
   the controller communicatively coupled to the electrooptical sensor and the actuator, the controller configured to generate control voltages based on signals received from the electrooptical sensor to deform a portion of the deformable surface proximate a corresponding pocket of the plurality of pockets.

2. The on-mirror adaptive optics system of claim 1, wherein deforming the deformable surface by the actuator compensates for wavefront phase aberrations or distortions.

3. The on-mirror adaptive optics system of claim 1, wherein the actuator is a multi-electrode bimorph element.

4. The on-mirror adaptive optics system of claim 1, further comprising a dielectric layer on the deformable surface, wherein the dielectric layer is configured to transmit first wavelengths of optical signals and reflect second wavelengths of optical signals.

5. The on-mirror adaptive optics system of claim 1, wherein the controller is configured to:
   receive signals from the electrooptical sensor indicative of aberrations or distortions in the optical signals travelling through the corresponding pocket;
   generate control voltages to compensate for the aberrations or distortions; and
   transmit the control voltages to the actuator.

6. The on-mirror adaptive optics system of claim 5, wherein the controller is positioned in each of the corresponding pockets of the plurality of pockets.

7. The on-mirror adaptive optics system of claim 5, wherein the controller is positioned outside of the plurality of pockets and controls multiple pockets of the plurality of pockets.

8. The on-mirror adaptive optics system of claim 1, each of the pockets further comprising a circuit board including one or more electronic components configured to sense aberrations or distortions in optical signals received at each of the corresponding pockets of the plurality of pockets.

9. The on-mirror adaptive optics system of claim 1, further comprising receiver optics including a primary mirror and a secondary mirror, the receiver optics optically coupled to one or more of the plurality of pockets.

10. The on-mirror adaptive optics system of claim 1, further comprising transmitter optics including a primary mirror and a secondary mirror, the transmitter optics optically coupled to one or more of the plurality of pockets.

11. The on-mirror adaptive optics system of claim 1, further comprising:
    receiver optics including a primary mirror and a secondary mirror;
    one or more optical elements configured to reimage or scale optical signals travelling to the plurality of pockets; and
    an optical sensor configured to receive optical signals from the plurality of pockets.

12. The on-mirror adaptive optics system of claim 1, further comprising:
    a beam forming optical system configured to generate a laser beam;
    one or more optical elements configured to reimage or scale the laser beam from the beam forming optical system and traveling to the plurality of pockets; and
    transmitter optics including a primary mirror and a secondary mirror, the transmitter optics configured to transmit an outgoing laser beam.

13. The on-mirror adaptive optics system of claim 1, further comprising transmitter or receiver optics including a primary mirror and a secondary mirror, wherein the substrate and the plurality of pockets are included in the primary mirror or the secondary mirror.

14. The on-mirror adaptive optics system of claim 1, further comprising a transmitter or receiver optics optically coupled to the plurality of pockets.

15. The on-mirror adaptive optics system of claim 14, wherein the transmitter or receiver optics include a primary mirror and a secondary mirror.

16. The on-mirror adaptive optics system of claim 14, further comprising:
    one or more optical elements configured to reimage or scale optical signals travelling to the plurality of pockets; and an optical sensor configured to receive optical signals from the plurality of pockets.

17. The on-mirror adaptive optics system of claim 14, further comprising:
a beam forming optical system configured to generate a laser beam; and
one or more optical elements configured to reimage or scale the laser beam from the beam forming optical system and traveling to the plurality of pockets.

18. The on-mirror adaptive optics system of claim 14, wherein the transmitter or receiver optics include a primary mirror and a secondary mirror, and the substrate and the plurality of pockets are included in the primary mirror or the secondary mirror.

19. An on-mirror adaptive optics system comprising:
a substrate including a deformable surface; and
a controller;
a plurality of pockets defined in the a substrate, each of the pockets comprising:
an electrooptical sensor; and
an actuator;
a receiver configured to receive optical signals travelling through the corresponding pocket of the plurality of pockets;
a receiver processor coupled to the receiver and configured to measure optical signals received at the receiver and transform the optical signals to electrical signals;
the controller communicatively coupled to the electrooptical sensor and the actuator, the controller configured to generate control voltages based on signals received from the electrooptical sensor to deform a portion of the deformable surface proximate a corresponding pocket of the plurality of pocket
wherein the controller is coupled to the receiver processor and configured to receive the electrical signals.

20. The on-mirror adaptive optics system of claim 19, wherein the actuator comprises a plurality of electrodes arranged in a circular pattern around an opening of the corresponding pocket of the plurality of pockets.

* * * * *